United States Patent [19]

Sudo

[11] 4,047,997
[45] Sept. 13, 1977

[54] METHOD FOR MANUFACTURING A FLATTENED CYLINDRICAL FILM CONSISTING OF LAYERS OF THERMOPLASTIC RESIN STRETCHED LENGTHWISE AND CROSSWISE

[76] Inventor: Michio Sudo, c/o Nikko Resin Co., Ltd., Fujikoshi Bldg. No. 23-7,5-chome, Higashi, Gotanda, Shinagawa, Tokyo, Japan

[21] Appl. No.: 661,635

[22] Filed: Feb. 26, 1976

Related U.S. Application Data

[60] Continuation of Ser. No. 539,611, Jan. 8, 1975, abandoned, which is a division of Ser. No. 330,043, Feb. 2, 1973, Pat. No. 3,894,907.

[30] Foreign Application Priority Data

June 26, 1972 Japan .................................. 47-63273

[51] Int. Cl.² ............................................. B29C 27/02
[52] U.S. Cl. .................... 156/229; 156/244; 156/309; 264/210 R; 264/289
[58] Field of Search .............. 156/229, 244, 277, 494, 156/309; 264/288, 292, 289, DIG. 73, 210 R; 428/DIG. 910

[56] References Cited

U.S. PATENT DOCUMENTS

| 3,322,613 | 5/1967 | Rasmussan | 264/288 |
| 3,539,666 | 10/1970 | Schirmer | 264/292 |
| 3,726,743 | 4/1973 | Reifenhauser et al. | 156/494 |
| 3,754,063 | 8/1973 | Schirmer | 156/277 |
| 3,926,706 | 12/1975 | Rahlfs et al. | 156/244 |
| 3,953,557 | 4/1976 | Brax et al. | 156/244 |

Primary Examiner—Charles E. Van Horn
Assistant Examiner—Jerome W. Massie
Attorney, Agent, or Firm—Michael J. Striker

[57] ABSTRACT

This invention relates to a method and apparatus for manufacturing a multi-layer flattened cylindrical film of thermoplastic resin stretched its layers crosswisely, the outer one being stretched lengthwise, the inner one transversely, more particularly, relates to a method and apparatus for manufacturing a multi-layered cylindrical film of thermoplastic resin stretched its layers crosswise, the outer one being stretched lengthwise having a larger diameter than the inner one which is stretched transversely being expanded by means of an inner mandrel so as to be stuck to the outer layer through an intermediate layer having a low melting point.

4 Claims, 12 Drawing Figures

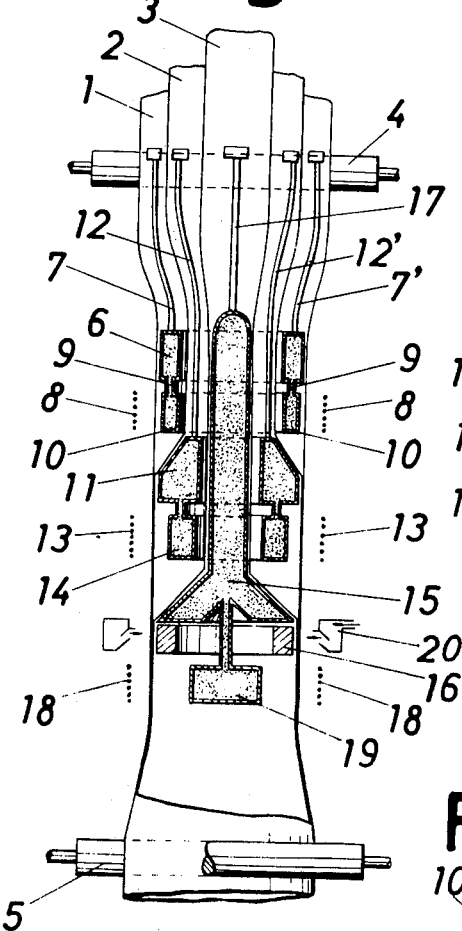
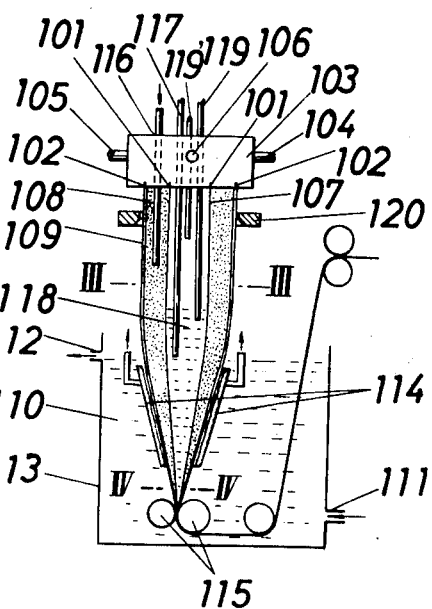
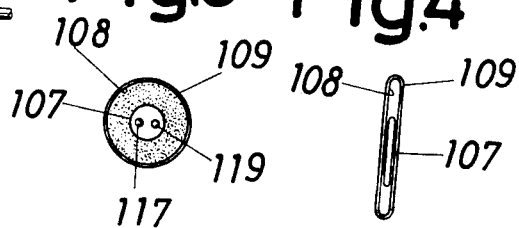

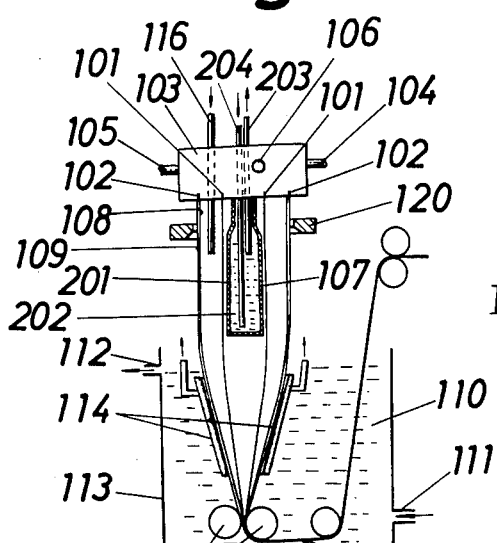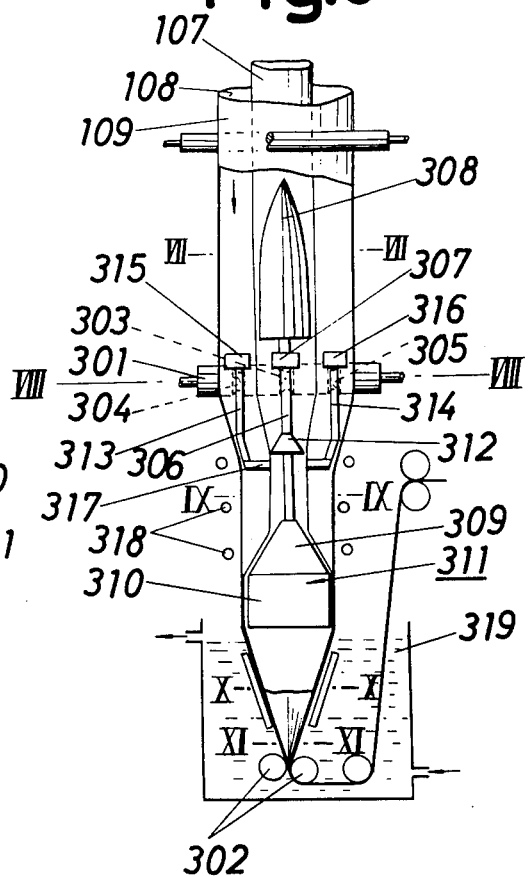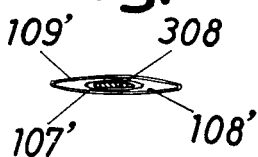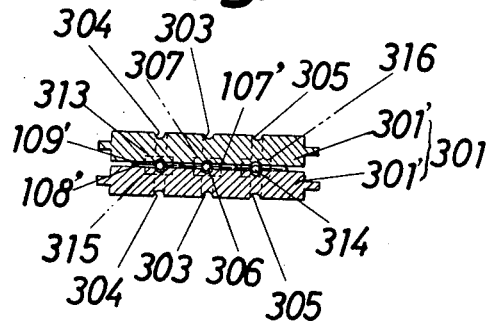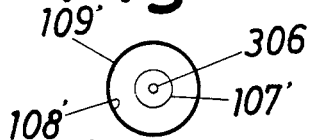

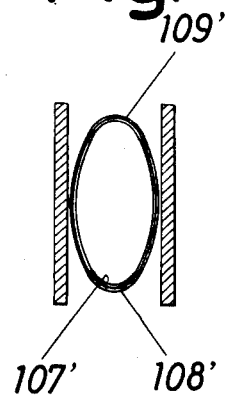
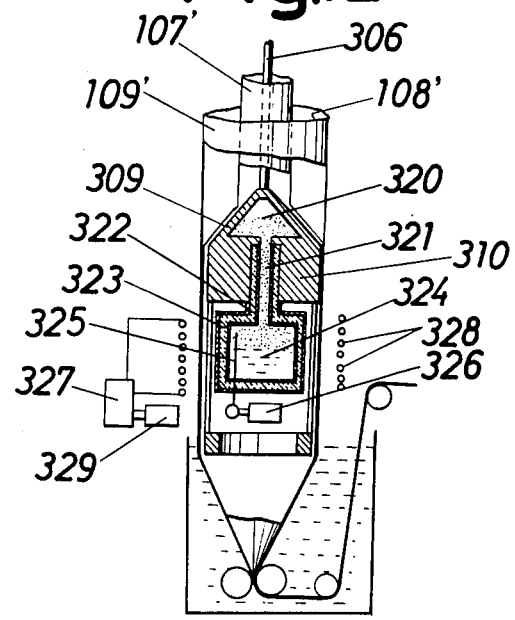
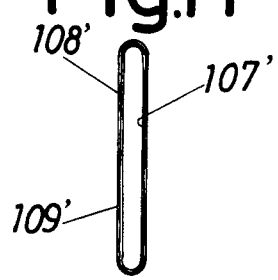

METHOD FOR MANUFACTURING A FLATTENED CYLINDRICAL FILM CONSISTING OF LAYERS OF THERMOPLASTIC RESIN STRETCHED LENGTHWISE AND CROSSWISE

This is a continuation, of application Ser. No. 539,611, filed Jan. 8, 1975, now abandoned, which was a division of application Ser. No. 330,043, filed Feb. 2, 1973, now U.S. Pat. No. 3,894,907.

BACKGROUND OF THE INVENTION

It has been well known, generally that in case the layers of the stratified films of thermoplastic resin are stretched crosswisely, one in the vertical, the other in lateral direction, the tensile strength can be increased in all directions so that this film having a thickness one half that of single-layer film can be employed for making a strong bag for packing the same weight of heavy materials.

The bag made of polyethylene of high density, generally employed for packing heavy materials of about 25 kg. weight, has a thickness of 0.2 mm. To manufacture such a bag from a cylindrical film of plastic resin, such an annular die having a double extruding slits for molten resin has been used, or to make multi-layer cylindrical film such an annular die having an extruding slit has been used, introducing another kind of molten resin from a guide groove adjacent the slits to be laminated, or for the same purpose as above, two flattened films having stretched in the same direction, have been stuck crosswisely with each other. To form a strong bag by these films, it is necessary to perform several troublesome steps such as sticking together two flattened cylindrical films with their lengthwise directions mutually perpendicular with adhesive paste; folding back the cut film along the lengthwise center line; sticking together the edges opposite the lengthwise center line so as to form a tube; and closing one end of the tube to make a bag.

Those troublesome steps inflict much loss upon the advantage obtained by saving the material, decreasing the thickness so that the thick flattened film has been compelled to be used for the bag for packing heavy materials. Thus, an economical method and apparatus for manufacturing a multi-layer film is earnestly demanded by those in the same technical field as this art.

SUMMARY OF THE INVENTION

An object of the present invention is to provide a method and apparatus for manufacturing flattened cylindrical film consisting of stretched layers of thermoplastic resin to make economically a strong bag for packing heavy materials, which is thermostable and has a large tensile strength and para-shock quality. In the method, the cylindrical film consist of of three concentric layers, of which the outer one having the largest diameter is stretched lengthwise, the inner one having the smallest diameter is stretched transversely, the middle one having a low melting point is heated almost to the melting point to stick the outer and inner layers to each other, the inner layer being expanded outwardly to be pressed against the other layers by means of an inner mandrel.

Another object of the present invention is to provide an apparatus and method for manufacturing a flattened cylindrical film consisting of stretched layers of thermoplastic resin to make ecomomically a bag for packing heavy materials, which is thermostable and has a large tensile strength and para-shock quality. In the method, three tubes of molten plastic resin for making cylindrical multi-layer film are extruded concentrically through three slits of an annular die, and guided along a heating device through first nip-roll so that the outer tube is stretched lengthwise by the second nip-roll and the inner tube is stretched transversely being expanded by an inner mandrel which holds remaining heat. Then, by a stratifying mandrel these tubes are welded through the middle tube which is heated almost to the low melting point by the inner mandrel holding remaining heat. The welded tubes as a united multi-layer film is then guided toward a second nip-roll which is driven faster than the first after being cooled quickly by a cooling device arranged outwardly relative to the multi-layer film.

Another object of the present invention is to provide an apparatus and a method for manufacturing a cylindrical multi-layer film consisting of a lengthwise stretched outer layer, and a transversely stretched inner layer crosswisely to each other, between the outer and inner layers, a middle layer having a low melting point being welded with either of the outer of inner layer prior to weld both of them.

Another object of the present invention is to provide an apparatus and a method for manufacturing a strong cylindrical multi-layer film consisting of a lengthwise stretched outer layer and a transversely stretched inner layer, between the outer and inner layers being provided a middle layer without welded to either of the two layers, wherein a heating mandrel is provided for each layer of plastic resin, each of which has a different melting point. For sticking the outer and inner layers, the middle layer having a low melting point is heated to almost the melting point without to be substantially melted.

Some embodiments of the invention are hereinafter set forth, with reference to the accompanying drawings, in which:

FIG. 1 illustrates how to manufacture a multi-layer cylindrical film being provided a middle layer having a low melting point without welded to either of the outer or inner layer.

FIG. 2 illustrates another embodiment of the present invention of manufacturing a multi-layer cylindrical film wherein a middle layer having a low melting point is welded to one of the two layers.

FIG. 3 is a cross sectional view along the line III—III of FIG. 2.

FIG. 4 is a cross sectional view along the line IV—IV of FIG. 2.

FIG. 5 illustrates another embodiment of the present invention of manufacturing a multi-layer cylindrical film wherein an inner mandrel is provided.

FIG. 6 illustrates a process of manufacturing stratified cylindrical film from the multi-layer cylindrical film obtained by means of the process of FIGS. 2 and 5.

FIG. 7 is a cross sectional view along the line VII—VII of FIG. 6.

FIG. 8 is a cross sectional view along the line VIII—VIII of FIG. 6.

FIG. 9 is a cross sectional view along the line IX—IX of FIG. 6.

FIG. 10 is a cross sectional view along the line X—X of FIG. 6.

FIG. 11 is a cross sectional view along the line XI—XI of FIG. 6.

FIG. 12 illustrates a heating system for an inner cylindrical film.

DETAILED DISCLOSURE OF THE INVENTION

EMBODIMENT I: Inside the outer cylindrical film 1 of a thickness of 0.06 mm, and a diameter of 540 mm, made of such polyolefin synthetic resins having a high melting point and large rigidity as polyethylene or polypropylene having heavy molecular weight, a middle cylindrical layer 2 of a thickness of 0.06 mm and a diameter of 400 mm, made of such synthetic resins having a low melting point and a soft quality as ethylene acetate vinyl co-polymers or ethylene ethylacrylate, is arranged and inside of the middle layer, an inner layer 3 of a thickness 0.15 mm and of a diameter of 210 mm, made of the same material as of the outer layer 1 is arranged concentrically with the other layers 1, 3 so as to be united in a multi-layer film. When each layer is guided from first nip-rolls 4 to second nip-rolls 5, they go round covering their respective mandrels which are supported by the first nip-rolls 4, namely, as shown in FIG. 1, a heating annular mandrel 6 for stretching the outer cylindrical film 1 is supported by the first nip-rolls 4 through legs 7, 7' while the outer cylindrical film 1 is going to be delivered to the second nip-rolls 5, the outer film 1 goes round covering around the heating annular mandrel 6 of which outer diameter is 345 mm. The first nip-rolls 4 rotate slower than the second. In case, polyethylene having a high density of molecule is used for the outer cylindrical film 1, the mandrel 6 is needed to be heated constantly at 115° C to stretch the film so that the mandrel 6 made of conductive material is connected to a high frequency electric power source circuit through a high frequency coil 8 and an automatic thermo-controller which are provided outerside thereof. A kettle 10 made of conductive material connected to the automatic thermo-controller is arranged under the mandrel 6 through a duct 9 through which steam generated from boiled water in the kettle 10 is forwarded to the mandrel 6 to heat it constantly and decrease the thermo-difference of the mandrel 6.

A conical heating mandrel 11 for stretching the middle layer 2 in both lengthwise and transverse directions having a space at its centre portion, is supported through legs 12, 12' by the first nip-rolls and is located under the kettle 8 of the mandrel 6 passing through the central space of the heating mandrel 6. The outer diameter of the heating mandrel 11 is 345 mm. In case, ethylene acetate vinyl co-polymer is used for the middle cylindrical film 2, the mandrel 11 is needed to be heated constantly at 75° C to stretch the film, so that the mandrel 11 made of conductive material is connected to a high frequency electric power source circuit through a high frequency coil 13 and an automatic thermo-controller which are provided outside thereof. A kettle 14 is also arranged under the mandrel 11 and connected to the automatic thermo-controller for the same purpose of heating the mandrel 11. The middle layer going round the mandrel 11 descends toward the second nip-rolls 5 in layers with the outer film which is stretched lengthwisely.

A heating conical mandrel 15 for stretching transversely the inner cylindrical film 3 and a cylindrical mandrel 16 for stratifying each film are supported by the first nip-rolls 4 through a leg 17 so as to be arranged under the mandrel 11 through of which central space, those mandrels 15, 16 pass and are located in position. In case, polyethylene having a high density is used for the inner film 3 similarly to that of the outer film and the diameters of the bottom of the conical mandrel 15 and of the cylindrical stratifying mandrel 16 are assumed to be 345 mm, it is needed to heat the heating mandrel 15 at 123° C for stretching the inner film and for stratifying both the inner and outer films. For heating the mandrel 15, a kettle 19 is heated through a high frequency coil 18 similarly to heat other mandrels. The inner cylindrical film descending from the first nip-roll covering the leg 17 is stretched transversely along the conical mandrel 15 and at around the stratifying mandrel 16, the outer and middle films are adhered closely and then delivered to the second nip-rolls in layers. Outside of the stratifying mandrel 16 is provided a cooling device 20 for cooling quickly the stratified film by which a stratified cylindrical film is produced without letting the middle film go around.

The mandrels supported by the first nip-rolls through legs are hung on cylindrical bars riding over the nip-rolls, each of rolls is cut a semi-circle groove around its surface so as to form a round hole together with another groove of another roll to pass the leg therethrough.

In case, rotating speed of the second nip-rolls 5 is made twice of that of the first nip-rolls 4 and, thickness of each cylindrical film 1, 2, and 3 of each position will be 0.03 mm, so as to form a stratified film of a thickness of 0.09 mm. In an examination, a bag for packing material of 30 kg., made of the above mentioned stratified film having a thickness of 0.09 mm, was dropped from a height of three meters, after sealed by heating. Ten of such bags were tested fifty times, but could not find any breakage in the bags. Thus, it was approved that the quality of such plastic bags was much improved.

EMBODIMENT II: In the first embodiment, a middle cylindrical plastic layer of film 108 is formed between the outer 109 and inner 107 layer of film without being laminated to either of the two layers of film. In this second embodiment, a multi-layer cylindrical film may be produced by being laminated with a die wherein the middle cylindrical layer is welded to either of the outer or inner layer prior to be formed into a multi-layer film.

This embodiment has two steps to produce a stratified cylindrical film of plastic resin. In the first step, a middle cylindrical layer of film between the two layers is welded to either of the outer or inner layer prior to be formed into a multi-layer film. In the second step, the inner layer is stretched transversely and the outer layer is stretched lengthwisely and both of which are welded through the interposed cylindrical layer for welding the two layers.

FIGS. 2 to 4 illustrate a process to manufacture a multi-layer cylindrical film by the second embodiment in which, in a cylindrical layer 109 having a larger diameter is formed concentrically with an inner cylindrical layer 107 having a smaller diameter. Molten plastic resin extruded from a discharger (not shown in drawings) is discharged into an annular die 103 through inlets 104, 105 and extruded downwardly through an outer slit 102 and an inner slit 101 to form an outer bubble 109 of resin for outer layer of film and an inner bubble 107 of resin for inner layer. For laminating the outer bubble 109 with plastic resin having a lower melting point than those of outer and inner bubbles, an inlet 106 is provided which is communicated with another discharger (not shown in drawings) through which the resin to form a lamination 108 with the outer bubble 109 is extruded along the inner side of the outer bubble 109.

The inner bubble 107 extruded through the inner slit 101 comes down so as to be positioned inner side of the outer bubble 109. For forming three bubbles, three slits may concentrically be provided with the annular die 103. By forming a middle slit closely adjacent to the outer slit so that the bubble of resin having a lower melting point extruded through the middle slit may be formed a lamination 108 of resin having a low melting point so as to be laminated with the outer bubble. The resins extruded through the outer and inner slits may be of the same or different kind.

To prevent transformation of bubbles it is necessary to cool by air or by water or using both of them from outside for cooling the outer bubble 109. For cooling the inner bubble 107, cooling water is run through the inner annular die or is run in an inner mandrel attached to the die in such a way as shown in FIGS. 2 and 5, and is disclosed in U.S. Pat. No. 3,543,334 invented by the same inventor as this application, wherein the outer bubble 109 is guided after being cooled previously by a cooling ring 120 just after being extruded from the annular die 103, into the cooling water 110 of about 25° C which is filled in a cooling water tank 113 provided with a water introducing opening 111 and with an overflow discharging outlet 112 for keeping the water level constant. The cooled outer bubble 109 in the water is introduced between two boards 114 having a lot of apertures arranged in opposition to each other, through the apertures the cooling water being sucked by negative pressure. Prior to be formed into a cylindrical film 109′, the outer bubble 109 being prevented from being crumpled utilizing the negative pressure, is guided to nip-rolls 115 arranged at the bottom of the water tank 113. The numeral 116 in FIG. 2 denotes an air duct provided through inside the annular die 103, by which air is introduced by pressure into the outer cylindrical bubble 109 for preventing its transformation. The numeral 117 denotes a water supplying duct provided through inside the annular die 103 by which cooling water 118 is introduced into the inner bubble 107 just after the bottom of the bubble 107 having passed between the nip-rolls 115 for cooling the bubble 107. The overflown water is discharged through a conduit 119 to outside. The numeral 119′ denotes an air duct provided through inside the annular die 103, by which air is introduced by pressure from over the level of cooling water, into the inner cylindrical bubble 107 for preventing its transformation.

For cooling the inner bubble 107, cooling water 202 may be flown through pipes 203, 204 as shown in FIG. 5, which are provided in an inner mandrel 201 attached to the annular die 103.

For making a multi-layer film, out of the rigidifying bubbles by cooling, they are guided to the nip-tolls 115 to be flattened and the water in the inner bubble 107 in case it was cooled directly by it, it is squeezed out, and then they are delivered to a receiving device (not shown in drawings) provided outside of the tank 113. During they are squeezed by the nip-rolls 115 they are completely rigidified, so each layer of film will be welded to each another.

In the second step, each of layers of film is stretched and united as a stratified cylindrical film in such a way that the multi-layer film is heated to a low temperature at which the laminated resin is almost molten so that the outer laye of film 109 is stretched lengthwisely, and the inner layer of film 107 transversely and then, by the laminated resin which was laminated outside the outer film, both outer and inner layers of film are welded to form a stratified film. As shown in FIG. 6, the multilayer film is guided from the first nip-rolls 301 made of rubber having a large frictional co-efficient, to the second nip-rolls 302 of which rotating speed is higher than that of the first nip-rolls 301. In the middle portion and in the opposite end portion of the first nip-rolls 301 are formed respectively semi-circular grooves 304, 303 and 305 around each surface of the rolls 301′ so as to form holes between the rolls 301 respectively. Through the round middle hole 303 of them, is inserted a round bar 306 for suspending a stretching mandrel 311, the far 306 being extended upwardly by a transverse cylindrical bar 307 of teflon mounted over between the nip-rolls 301′, 301′ so that the bar 306 is supported by the cylindrical bar 307 of teflon. To the upwardly extended end of the round bar 306, is fixed a flat guide board 308 for guiding the cylindrical inner film, and at the lowest end thereof, is hung a stretching mandrel 311 consisted of a conical part 309 and a cylindrical part 310, and to the round bar 306 between the first nip-rolls 301 and the stretching mandrel 311, is fixed a ring 312 for expanding the inner cylindrical film. Into the holes 304, 305 formed by the grooves of each of the nip-rolls 301′, 301′ are inserted round bars 313, 314 respectively for supporting a ring 317 at the lowest end portion of each bar 313, 314 for expanding the outer flattened cylindrical film 109, and their upper ends are hung from cylindrical bar 315, 316 of teflon which are mounted over between the nip-rolls 301′, 301′.

The flattened cylindrical multi-layer film thus formed by the device having such a structure as above mentioned and shown especially in FIGS. 2 and 5, is guided downwardly along around the flat guide board 308 and the cylindrical bar 307 suspending the mandrel 311 through between the first nip-rolls 301 and along around the ring 312 for rounding the flattened cylindrical inner layer and downwardly along around the ring 317 for rounding the flattened cylindrical outer layer 109 laminated with the middle layer 108 of film, by which each of flattened cylindrical layers of film are rounded by the respective rings 312, 317, after each of layers of film being rounded they are guided downwardly along around the slope of the conical part 309 and then cylindrical part 310 of the mandrel 311 by which the inner film 107 is stretched in a lateral direction being stratified with the middle 108 and outer 109 layers and then they are guided to the second nip-rolls 302. By the higher speed of the second nip-rolls 302 than that of the first 301, they are stretched lengthwisely. Before they are guided along around the cylindrical part 310 of the mandrel 311, they are heated by a heating device 318 which is positioned outside of the outer layer 109 to be given a low temperature enough to fuse the laminated middle layer by which the outer and inner layers are welded being pressed outwardly by the cylindrical part 310 of the mandrel 311 and being stretched by the second nip-rolls 302 rotating faster than the first ones 301. Between the cylindrical part 310 of the mandrel 311 and the second nip-rolls 302, the unitedly stratified film by the mandrel 311 is cooled by cooling water 319 and thus a stratified film having a lengthwisely stretched outer layer 109′ and a laterally stretched inner layer 107′ is obtained.

Between the inner 107 and outer layer 109 of film there may be some space though they are rounded by the rings 312, 317 so that it is not enough to heat the inner layer of film 107 by only the outside heater 318, that the inner cylindrical layer of film may be heated from inside by a heated conical part 309 of the mandrel 310. But it is hard to arrange a wire and pipe for heating the mandrel 310 which is surrounded by the cylindrical layers of film 107', 108', and 109' and is suspended from the first nip-rolls 301 through the supporting round bar 306. For the purpose of heating from inside a high frequency system is provided within the inner cylindrical film as shown in FIG. 12, namely, a vertical aperture 321 is formed in the centre of the conical part 309 and the cylindrical part 310 of the mandrel 311. The numeral 320 is a hollow formed in the conical part 309. Under the cylindrical part 310 is suspended a kettle 323 covered with an adiabatic material 322 which is filled with the water 324 previously, for generating steam to close and open the circuit of a thermostat 325 connected to an ultra-short wave transmitter 326 which is operated by switching the thermostat 325 to ON, under a determined high temperature. Outside around the outer cylindrical film 109' is provided a high frequency coil 328 connected to a high frequency transmitter 327 to which an ultra-short wave receiver 329 to receive the waves transmitted from the ultra-short wave transmitter 326 inside the cylindrical layers 107', 108' and 109' of film, is connected for switching the high frequency transmitter 327 to OFF by a relay which is operated by the waves received from the ultra-short wave receiver 329.

When the temperature of water in the kettle 323 is lower than the temperature set to the thermostat 325, the circuit between the thermostat and the ultra-short wave transmitter 326 becomes OFF, and the transmission of ultra-short wave is cut so that the ultra-short wave receiver 326 to signal to the high frequency transmitter 327, does not receive as well as the relay connected thereto, is not operated that the circuit of the high frequency transmitter 327 becomes ON, and the water in the kettle 323 is heated by the coil 328 induced electricity to generate steam which rises through the upper aperture 321 and into the hollow 320 of the conical part 309 to be heated. Thus, the conical part 309 is constantly heated under a determined temperature to heat the inner cylindrical film 107' descending around the conical part 309 by which being stretched laterally without leaving wrinkles, so that the inner cylindrical film 107' is welded completely with the outer cylindrical film 109' which is also heated by the outside heater 318 by means of the pressure of the cylindrical part 310 of the mandrel 311.

Now, the above mentioned embodiment will be explained more concretely:

For the inner and outer layer of film 107, 109 such resin as high density polyethylene (H.D.P.E.), and for the middle layer of film 108 to be laminated with the outer film 109 through the die such resin having a low melting points as ethylene acetic acid vinyl co-polymers (E.V.A.) are used. In the first step, as shown in FIG. 2 or 5, determine the diameter of the outer slit 102 of the double annular dies 103 as 21 cm., and that of the inner slit 101 as 10 cm., and the breadth of each slit 101, 102 as 1 mm., then extrude both resins through each slit to make the ratio of thickness of both outer film 109 and middle film 108 having a low melting point to be H.D.P.E.:E.V.A. = 1 : 1, and then find the rotating speed of the nip-rolls 115, controlling the rotating speed of the screw of extruding machine to make the thickness of the outer film 109 with the middle film 108 as 0.12 mm. and that of the inner film 107 as 0.12 mm. in the process of being cooled.

In the second step, as shown in FIG. 6, determines the base angle of the conical part 309 as 45°, and the diameter of the cylindrical part 310 positioned beneath the bottom of the conical part 309 as 22 cm., then the outer film 109 with the middle film 108 will not be stretched laterally. But, as the rotating speed of the second nip-rolls 302 are made to rotate faster than the first 301, the outer film 109 with the middle film 108 will be stretched lengthwisely. In case the thickness of the outer film 109 with the middle film 108 is formed to be of 0.08 mm., the length stretched vertically will be one and half times what it was. At the same time the inner film will be stretched vertically lengthened one and half times and laterally lengthened twice what it was by the rotation of the conical part 309 of the stretching mandrel 311 to be formed a laterally stretched inner film 107' having a thickness of 0.04 mm. Then, the cylindrical layers of inner 107' and outer 109' with middle 108' laminated film are heated by a heater 318 under about 120° C while descending, without forming any rimple by being stretched and around the cylindrical part 310 of the stretching mandrel 311, the outer 109' and inner 107' layers of film are welded unitedly by the melting middle layer 108' of E.V.A. co-polymers. After they were welded into a unit stratified film, since it is cooled quickly, the moleculars of it, are prevented from crystallizing. Thus, a stratified film having a high transparency is obtained though the film is stratified with layers.

As above mentioned, in this embodiment, the inner cylindrical film 107 having a small folded diameter is rounded by the conical part 309 of the stretching mandrel 311 and again is rounded and expanded by the cylindrical part of the mandrel 311, of which diameter is a little larger than that of the outer film 109, and is stretched laterally being expanded as large as the outer film 109' having laminated middle film 108'; and the outer cylindrical film 109 having a laminated middle film 108 is stretched lengthwisely by being pulled by the second nip-rolls 302 which rotate faster than the first ones 301, and welded to the inner film 107' around the cylindrical part 310 of the stretching mandrel 311, with the melted middle film 108' having a low melting point to be stuck with each another, so that it is very easy to produce such a film having crosswisely stretched layers without forming any rumples thereon.

Because of such construction as mentioned above the cylindrical layers 107, 108, 109 of film will never be flawed or form rumples when they pass between the nip-rolls 301, or pass around the ring 317, namely, the stretching mandrel 311 is suspended with a leg 6 from the cylindrical bar 307 of teflon mounted over between the rolls 301', 301' of the first nip-rolls 301 of rubber have a large frictional co-efficient which deliver the layers 107, 108, 109 of film downwardly by their rotation of the direction of their osculating circumferences without giving them a skid and make them pass through among the cylindrical bar 307 of teflon having a small frictional co-efficient and the nip-rolls 301', 301' and between the osculating circumferences of the nip-rolls 301', 301'. The ring 317 for rounding the outer cylindrical films is also suspended from the first nip-rolls so that it will never give such bad effects as to form rumples or scratches on the film by vibration.

The middle cylindrical film 107 having a low melting point can be laminated on the inner film 107 at its outer side and resins used for the outer film 109 can be different from that of the outer film 109.

The present invention is characterized in that a strong stratified cylindrical film can be manufactured economically by an apparatus and method wherein, the inner cylindrical film having a smaller folded diameter is formed within the outer cylindrical film having a larger folded diameter concentrically, the former being stretched laterally, and the latter being stretched lengthwisely and the former being stuck to the inside of the latter. By heating the middle cylindrical film having a low melting point, to almost the melting point, by which the outer and inner cylindrical films are welded and thus, a stratified film, each of which layer is stretched crosswisely making its physical properties strong. In the prior art, it was needed 220 to 230 gram per one meter square of polyethylene having a low density of molecules for making a bag of a single layer film for packing such heavy material as 30 kg., while in the present invention for making a bag having the same strength as mentioned above, only 50 to 60 gram of resin is needed. Thus, it is approved that by this invention strong plastic bags are produced very economically.

What is claimed is:

1. A method for producing laminated tubing comprising the steps of simultaneously extruding an outer, an intermediate and an inner tube of plastic material concentrically with at least said outer and said inner tube radially spaced from each other, said intermediate tube being extruded from a material having a lower melting point than the other two tubes; drawing said outer tube over a first mandrel so as to stretch said outer tube only in longitudinal direction; drawing said inner tube over a second mandrel which diverges in said longitudinal direction so as to mechanically stretch said inner tube in a direction transverse to said longitudinal direction to a diameter substantially equal to that of said outer tube; drawing said intermediate tube over a third mandrel so as to stretch said intermediate tube in both longitudinal and transverse directions; and heating said mandrels and transmitting heat from the same to said tubes during the stretching thereof so as to weld said outer tube stretched in said longitudinal direction, said intermediate tube stretched in said longitudinal and said transverse direction, and said inner tube stretched in said transverse direction together by heating said intermediate tube close to its melting point while pressing said tubes against each other.

2. A method as defined in claim 1, wherein said tubes are heated prior to stretching said inner tube in said transverse direction.

3. A method as defined in claim 1, wherein said tubes are heated at the inside and at the outside thereof at least during stretching said inner tube in said transverse direction.

4. A method as defined in claim 1, and including the step of rapidly cooling said tubes after said welding step.

* * * * *